United States Patent [19]

Whyte et al.

[11] Patent Number: 4,519,919

[45] Date of Patent: May 28, 1985

[54] METHOD AND APPARATUS FOR MAGNETICALLY TREATING FLUIDS

[76] Inventors: Lance Whyte, 5307 Queensberry Ave., Springfield, Va. 22151; Elliott E. Herweyer, P.O. Box 257, Goochland, Va. 23063

[21] Appl. No.: 496,243

[22] Filed: May 19, 1983

[51] Int. Cl.³ .............................................. B01D 35/06
[52] U.S. Cl. .................................... 210/695; 210/222
[58] Field of Search ............... 210/222, 223, 243, 695; 55/3, 100; 209/213, 224, 232

[56] References Cited

U.S. PATENT DOCUMENTS

| | | |
|---|---|---|
| 1,335,955 | 4/1920 | Cox . |
| 1,948,419 | 2/1934 | Granigg . |
| 2,149,764 | 3/1939 | Frei . |
| 2,596,743 | 5/1952 | Vermeiren . |
| 2,652,925 | 9/1953 | Vermeiren . |
| 2,939,830 | 6/1960 | Green et al. . |
| 3,228,878 | 1/1966 | Moody ................................ 210/222 |
| 3,345,594 | 10/1967 | Vermeiren ........................... 210/222 |
| 3,349,354 | 10/1967 | Miyata ................................ 210/222 |
| 3,669,274 | 6/1972 | Happ et al. ......................... 210/222 |
| 3,830,621 | 8/1974 | Miller ..................................... 55/3 |
| 3,923,660 | 12/1975 | Kottmeier ........................... 210/222 |
| 4,146,479 | 3/1979 | Brown ................................ 210/222 |
| 4,153,559 | 5/1979 | Sanderson .......................... 210/222 |
| 4,201,140 | 5/1980 | Robinson ............................ 210/222 |
| 4,226,720 | 10/1980 | Brigante ............................. 210/222 |
| 4,238,183 | 12/1980 | Robinson ............................... 55/3 |
| 4,366,053 | 12/1982 | Lindler .............................. 210/222 |
| 4,367,143 | 1/1983 | Carpenter ........................... 210/222 |
| 4,372,852 | 2/1983 | Kovacs .............................. 210/222 |

OTHER PUBLICATIONS

"Magnetic Treatment of Water", Advanced Research Projects Agency, ARPA Order No. 1622-3, Jan. 30, 1973, pp. 1-9.

Primary Examiner—Richard V. Fisher
Assistant Examiner—W. Gary Jones
Attorney, Agent, or Firm—Dennison, Meserole, Pollack & Scheiner

[57] ABSTRACT

An apparatus for and method of magnetically treating flowing fluids includes a housing into which a fluid stream is directed and in which the stream is divided into a plurality of separate flow paths. Each of the flow paths within the housing is subjected to a monopolar magnetic influence and a baffle configured to induce turbulence in the flow path to insure exposure of all of the fluid in the path to the monopolar magnetic influence. The separate flow paths are at least partially recombined to a single flow path and discharged from the housing.

19 Claims, 7 Drawing Figures

U.S. Patent  May 28, 1985  Sheet 1 of 2  4,519,919
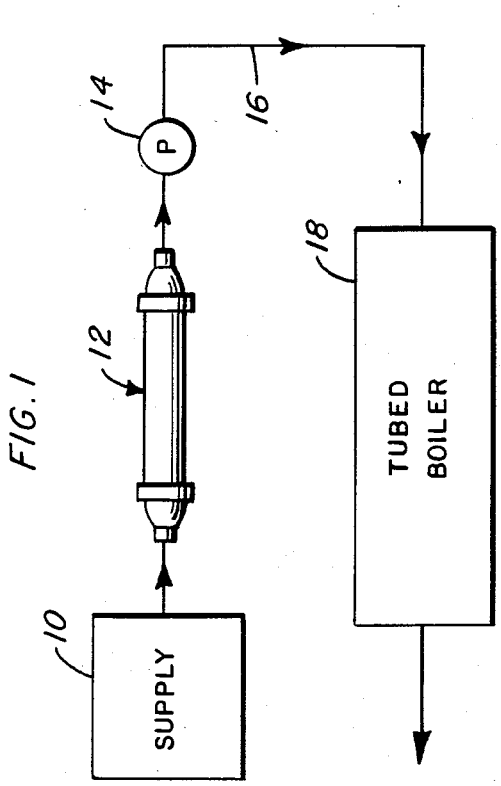
FIG. 1
FIG. 2
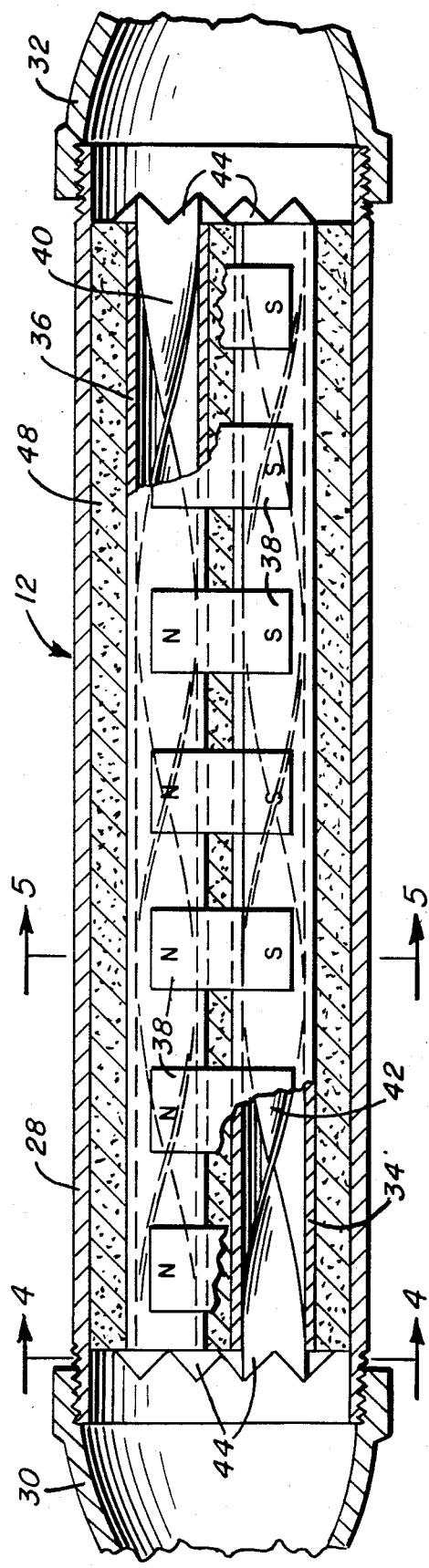
FIG. 3

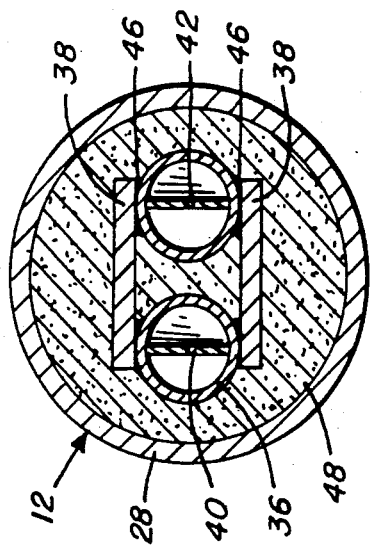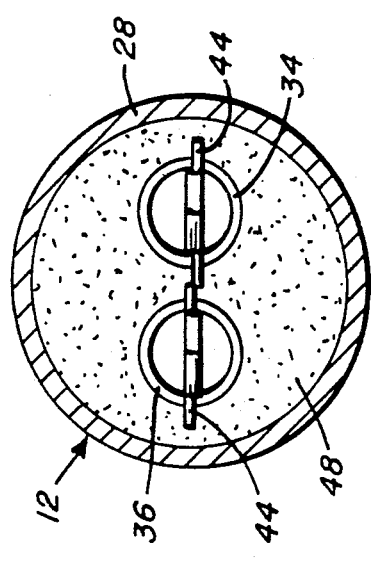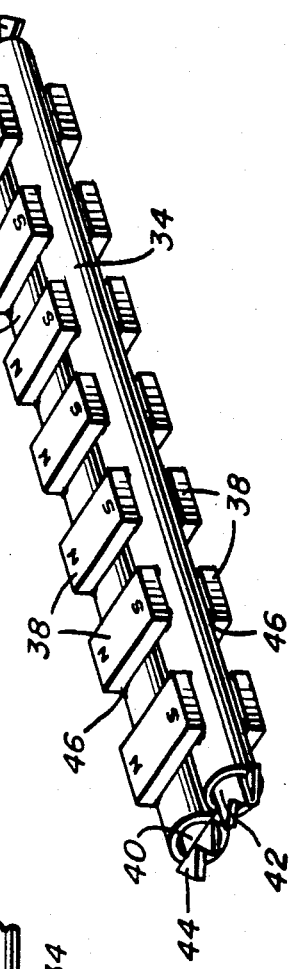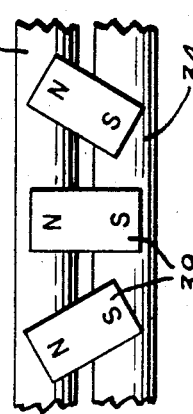

METHOD AND APPARATUS FOR MAGNETICALLY TREATING FLUIDS

BACKGROUND OF THE INVENTION

1. Field of the Invention

This invention relates to the treatment of fluids in a confined environment and more particularly, to the magnetic treatment of water and fuels to enhance their quality. With respect to water, the magnetic treatment provides a modification of the scale producing capabilities of the water and reduces corrosive etching, enhances the reduction of scale formation and reduces existing scale caused by minerals, other dissolved solids, colloidal suspensions, and other contaminants in the fluid medium system.

2. The Prior Art

It has been recognized for some time that subjecting flowing water to magnetic influences produces changes in the water which are not wholly understood, but which have a tendency to improve the quality of the water and result in a reduction in scaling and corrosion without the introduction of reagents and other purification techniques. The known prior art is best exemplified by the following U.S. patents and an article entitled "Magnetic Treatment of Water", dated Jan. 30, 1973, and prepared by Informatics, Inc. of Rockville, Md.: U.S. Pat. No. 1,335,955, Cox, Apr. 6, 1920; No. 1,948,419, Granigg, February 1934; No. 2,149,764, Frei, Mar. 7, 1939; No. 2,596,743, Vermeiren, May 13, 1952; No. 2,652,925, Vermeiren, Sept. 22, 1953; No. 2,939,830, Green et al, June 7, 1960; No. 3,228,878, Moody, Jan. 11, 1966; No. 3,345,594, Vermeiren, Oct. 3, 1967; No. 3,669,274, Happ et al, June 13, 1972; No. 3,680,705, Happ et al, Aug. 1, 1972; No. 3,830,621, Miller, Aug. 20, 1974; No. 4,153,559, Sanderson, May 8, 1979; No. 4,366,053, Lindler, Dec. 28, 1982; No. 4,367,143, Carpenter, Jan. 4, 1983;

SUMMARY OF THE INVENTION

The structure for and method of treating water as well as other fluids consists of a housing into which the fluid to be treated is directed and in which it is divided into at least two flow paths. Each of the flow paths is subjected to a monopolar magnetic influence emanating from a magnetic means positioned with respect to the flow path to insure that the fluid flowing therethrough will be exposed to the monopolar magnetic fluid. After subjecting each of the several flow paths to such magnetic influence, the fluid is at least partially recombined and discharged from the outlet of the housing. The separate flow paths and magnetic means are supported within or in respect to the housing in a substantially fixed relationship with respect to the housing and with respect to each other. The housing is configured and the flow paths are arranged so that the inlet and outlet may be reversed to change the direction of flow, if necessary.

BRIEF DESCRIPTION OF THE DRAWINGS

FIG. 1 is a schematic view of the invention positioned in a supply line between a water supply and a tubed boiler.

FIG. 2 is a schematic view of the invention placed in a fuel supply line between the fuel tank and the fuel induction system of an internal combustion engine.

FIG. 3 is an enlarged fragmentary sectional view of the housing of the invention with the internal arrangement of the separate flow paths partly broken away.

FIG. 4 is a cross-sectional view taken along the lines 4—4 of FIG. 3.

FIG. 5 is a cross-sectional view taken along the lines 5—5 of FIG. 3.

FIG. 6 is a perspective view of a dual flow path and magnet assembly prior to introduction into the housing.

FIG. 7 is a fragmentary plan view of the dual flow path and magnet assembly of FIG. 6 with the magnets arranged in an angular relationship with respect to the longitudinal axis of the tubes.

We have found that fluids, such as water and fuels, can be favorably effected by subjecting such fluids to magnetic influences before introducing such fluids into a use environment. Considering first the treatment of water, it has been recognized for some time that when subjected to magnetic influences, qualities of water may be improved or modified, particularly in regard to scale formation reduction, corrosion resistance and the separation of dissolved solids, colloidal suspensions, and other contaminants in the fluid system. It is not completely understood how these beneficial effects occur, but it is well documented that they do occur and there are numerous examples in the prior art of the favorable results achieved by magnetically treating water, for example.

Our invention differs from all of the prior art of which we are aware in that the fluid under treatment in our invention is directed through at least a pair of separate flow paths and in each such flow path, the fluid therein is subjected to an interrupted monopolar magnetic influence. As an example,, if two flow paths are employed, both of the flow paths may be subjected exclusively to a northerly magnetic influence or one or the other may be subjected exclusively to a southerly magnetic influence. Following exposure to the isolated monopolar influences, the fluid is at least partially recombined and discharged from the housing of the invention for delivery to the environment in which it will be employed.

DETAILED DESCRIPTION OF THE PREFERRED EMBODIMENT

Considering now the drawings in detail, FIG. 1 illustrates schematically a water supply 10 directed to a treatment housing 12 from which it proceeds to a pump 14 and through appropriate conduits 16 to a boiler, or the like, 18.

A similar arrangement is seen in FIG. 2 wherein fuel, for example, gasoline, diesel fuel, kerosene, etc. is supplied from a tank 20 to the housing 12 of our invention and subsequently to a fuel pump 20 and through appropriate conduits 22 to the induction system 24 of an internal combustion engine (ICE) 26.

Referring now to FIG. 3, the housing 12 is seen to include a generally tubular body portion 28 which is appropriately threaded at each end to accommodate an end closure 30, 32.

Because the housing may be selectively reversed in use without detracting from the effectiveness of treatment of the fluid, flow through the housing may be generated from either direction. Each end cap 30, 32 may be considered as an inlet or an outlet depending upon the particular installation in the system in which the invention is utilized. Moreover, the device once installed may be subsequently removed and inverted to direct flow in the opposite direction if desired.

Within the tubular housing 28 there are, as illustrated in this the preferred embodiment, a pair of non-paramagnetic and thus generally non-ferrous treatment tubes 34 and 36. These treatment tubes lie in substantially parallel relationship, though that relationship is not mandatory. A plurality of bar magnets 38 are positioned in a bridging arrangement across the tubes in spaced relation and as best seen in FIGS. 5 and 6, pair of magnets may be positioned on opposite sides of the tubes and in spaced relation with respect to each other throughout the length of the treatment tube array. Each of the magnets 38 is arranged such that all north poles are in proximity to one of the treatment tubes, thus providing an interrupted northerly magnetic influence exclusively to that tube while the opposite south polar portion is postioned in proximity to the other of the treatment tubes thus subjecting fluid therewithin exclusively to an interrupted southerly magnetic influence. An alternative embodiment of magnet arrangement is illustrated in FIG. 7 wherein the magnet elements 39 are arranged along the axes of the treatment tubes in an angular rather than a parallel relationship as illustrated in FIG. 6.

In order to insure that all portions of the fluid passing through each of the tubes cross the interrupted magnetic flux fields at varied angles to insure that the fluid is thoroughly and completely subjected to the monopolar influence applied to that tube, turbulence inducing means as for example vanes 40, 42 are positioned within the tubes in a generally spiral configuration. The vanes are retained within the treatment tubes by any suitable means and as illustrated, include a plurality of ears 44 disposed externally of the respective end of each of the tubes or alternatively spiraling vanes could be integral with the tube interior wall.

As an alternative, magnetic elements may be positioned relative to fluid flow to present interrupted paths of magnetic flux along the tube at varying angles to thus eliminate the need for a turbulence inducing means within the treatment tube.

A subassembly of magnets and tubes is seen in FIG. 6 and may be retained in the assembled configuration shown in that figure by means of appropriate tapes of adhesive 46 interconnecting the respective magnetic elements with the tubes.

The subassembly may then be inserted in the housing and retained therein by the introduction of an appropriate supporting non-paramagnetic resinous mass 48 in the form of a potting resin, such as a catalytically hardened epoxy, polyester, or the like, which will insure retention of the tubes and magnets in the desired relationship and fill the voids created by the subassembly. Appropriate resins or other filler materials may be selected to be compatible with the fluids to be treated and in the case of fuels, such as gasoline, kerosene, diesel fuels, and the like, mechanical means may be substituted for the plastic filler material where necessary.

It is also within the contemplation of our invention that electro-magnetic means could be substituted for the permanent magnets illustrated in the drawings as long as interrupted magnetic influence is maintained monopolar with respect to each treatment tube, in which instance, of course, an appropriate supply of electrical energy would be employed to energize the electro-magnets. The materials from which our invention is fabricated may be selected to be compatible with the particular system in which the treatment device will be installed and this may include both metallic as well as nonmetallic housings, components and connecting means.

In operation, fluid to be treated will be introduced to the inlet end of the housing 28 through an appropriate connection means in either of the end caps 30, 32 and upon introduction to the interior of the treatment device, the fluid will be divided into two flow paths by natural selection. It is contemplated that the device may be mounted in substantially any orientation required to accommodate the needs of the particular installation so long as the fluid flow through the several treatment tubes is substantially unimpeded and simultaneous.

As the fluid proceeds through the several treatment tubes, it is subjected to an interrupted monopolar magnetic influence and is, as illustrated in FIG. 3, spirally agitated to insure substantially complete distribution of the fluid through the magnetic influence of the polar end of the magnet adjacent the tube. Upon completion of the traverse of the treatment tubes, at least a portion of the fluid is discharged into the interior chamber at the opposite end of the housing where it is recombined and discharged through the outlet to the environmental usage in which it is to be employed.

Examples of the results of our experimentation in the development of this invention have indicated that when water or other fluids are magnetically treated by our system, new scale accumulation in any heat exchange environment is, for all practical purposes, eliminated and equally importantly, existing scale formations are reduced and a significant reduction in corrosive etching is achieved. We have found that the specific arrangement of subjecting a single stream of water to a monopolar influence while simultaneously subjecting the remaining or other stream of water to a monopolar and different influence significantly reduces or eliminates scale deposition and improves scale reducing qualities.

In addition to the treatment of water, we have also discovered that our invention produces significant beneficial results when employed as a treating facility for fuels for internal combustion engines. We have discovered that if treatment units of the type illustrated in our drawings are employed in the fuel lines interconnecting the supply tank and the induction system of an internal combustion engine, significant modification in fuel performance capabilities can be achieved. The physical phenomenon resulting from fuel treatment by our invention is not completely understood, but it is believed that a significant increase in flow rate at the same pressures and temperatures is achieved when the fuel is treated by our device. Moreover, our tests indicate that more complete combustion is achieved when fuel subjected to our treatment is employed.

As an example, we noted that following installation of our fluid treatment device on a conventional automotive internal combustion engine, gasoline consumption on a per mile basis increased as much as 500% and on one occasion, the gasoline consumption was increased from twelve miles per gallon to two miles per gallon. Engine performance was substantially unchanged, however, exhaust manifold temperatures increased more than 100°. Modification of the carburetor jetting to reduce the diameters thereof resulted in an increase in miles per gallon performance from twelve miles per gallon for untreated fuel and conventional jetting sizes to twenty-four miles per gallon with the treated fuel and jet sizes of reduced diameter with no loss of power or smoothness. Similar results were achieved in a diesel engine environment with a reduction in injector tip orifice diameter on the order of 30%.

Although our invention has been described in detail with regard to the preferred embodiment, it is to be understood that this embodiment is only an example of an operative construction of our invention and it is to be recognized that it is within our contemplation that various configurations of housings, treatment tube relationships, magnet mounting techniques, and the like, together with various other changes in the construction arrangement may be utilized without departing from the scope and spirit or our invention within the limitations set forth in the accompanying claims forming a part of this application.

We claim:

1. The method of subjecting a flowing fluid to an interrupted monopolar magnetic force field comprising the steps of:
   (1) dividing the fluid into at least two separate independent non-paramagnetic flow paths;
   (2) subjecting the fluid within each of the separate flow paths to an interrupted monopolar magnetic influence of opposite polarity; and
   (3) recombining at least a portion of said fluids in said divided flow paths into a common flow path.

2. The method defined by claim 1 wherein said fluid is liquid fuel.

3. The method defined by claim 1 wherein said fluid is gaseous fuel.

4. The method of subjecting a flowing fluid to an interrupted focused monopolar magnetic force field comprising the steps of:
   (1) dividing the fluid into at least two separate independent non-paramagnetic flow paths;
   (2) inducing turbulence in the fluid in at least one of said flow paths;
   (3) subjecting the fluid within each of the separate flow paths to a monopolar magnetic influence; and
   (4) recombining at least a portion of said fluids in said divided flow paths into a common flow path.

5. The method defined by claim 4 wherein said fluid is water.

6. The method defined by claim 4 wherein said fluid is fuel and conducting said magnetically treated fuel to the induction system of an internal combustion engine.

7. The method defined by claim 4 wherein said fluid is gasoline.

8. The method defined in claim 4 wherein said fluid is diesel fuel.

9. The method of subjecting a flowing fluid to a magnetic influence comprising the steps of:
   (1) dividing the fluid into at least two non-paramagnetic separate independent flow paths;
   (2) subjecting at least one of said flow paths to an interrupted monopolar magnetic influence generated by a plurality of magnets positioned adjacent said flow paths; and
   (3) positioning said magnets relative to said flow paths to present interrupted paths of magnetic flux along the fluid flow path at varying angles.

10. Apparatus for magnetically treating a flowing fluid comprising a housing including means defining an inlet, and at least two independent non-paramagnetic conduits defining separate fluid flow paths within said housing through which said fluid will flow simultaneously, magnetic means operatively positioned with respect to each of said flow paths to subject each path to separate interrupted monopolar magnetic influences, means connecting said separate flow paths to means defining an outlet and means supporting said separate conduits and said magnetic means in fixed relation to each other.

11. The apparatus defined by claim 10 wherein said independent flow paths are parallel.

12. The apparatus defined by claim 10 wherein said inlet and said outlet are reversible.

13. Apparatus for magnetically treating a flowing fluid comprising a housing including means defining an inlet and at least two independent non-paramagnetic conduits defining separate fluid flow paths within said housing through which said fluid will flow simultaneously, opposite polar magnetic means operatively positioned with respect to each of said flow paths to subject each path to a separate interrupted monopolar magnetic influence, means connecting said separate flow paths to means defining a common outlet and means supporting said separate conduits in fixed relation to each other.

14. Apparatus for magnetically treating a flowing fluid comprising a housing including means defining an inlet, and at least two independent non-paramagnetic conduits defining separate fluid flow paths within said housing through which said fluid will flow simultaneously, magnetic means operatively positioned with respect to each of said flow paths to subject each path to a separate interrupted monopolar magnetic influence, means connecting said separate flow paths to means defining a mixing zone and means defining a common outlet, means including a plurality of further outlets, and means supporting said separate conduits and said magnetic means within said housing in fixed relation to each other.

15. Apparatus for magnetically treating a flowing fluid comprising a housing including means defining an inlet, and at least two independent non-paramagnetic treatment tubes defining separate fluid flow paths within said housing through which said fluid will flow simultaneously, magnetic means operatively positioned with respect to each of said flow paths to subject each path to a separate interrupted monopolar magnetic influence, means connecting said separate flow paths to means defining a common outlet and means supporting said separate flow path means and said magnetic means in fixed relation to said housing and to each other.

16. The apparatus as defined by claim 15 wherein said magnetic means comprises a plurality of bar magnets positioned on said tubes in substantially parallel spaced relationship with respect to each other and transverse relationship with respect to said tubes.

17. The apparatus defined by claim 16 wherein each bar magnet is spaced along said treatment tubes a distance with respect to an adjacent magnet substantially equal to the width of the adjacent magnet.

18. The apparatus defined by claim 17 wherein said bar magnets are disposed on opposite sides of the treatment tube array with all north polar ends arranged adjacent one tube and all south polar ends adjacent another tube.

19. The apparatus defined by claim 15 includes internal baffle means extending within at least a portion of at least one of said treatment tubes.

* * * * *